US008190499B1

(12) United States Patent
McVickar

(10) Patent No.: US 8,190,499 B1
(45) Date of Patent: May 29, 2012

(54) METHODS SYSTEMS AND ARTICLES OF MANUFACTURE FOR COLLECTING DATA FOR FUTURE ELECTRONIC TAX RETURN

(75) Inventor: Richard E. McVickar, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 47 days.

(21) Appl. No.: 12/545,592

(22) Filed: Aug. 21, 2009

(51) Int. Cl.
*G06F 17/22* (2006.01)
*G06F 15/16* (2006.01)
(52) U.S. Cl. .......................... 705/31; 709/206
(58) Field of Classification Search ........................ None
See application file for complete search history.

(56) References Cited

U.S. PATENT DOCUMENTS

| | | | |
|---|---|---|---|
| 6,202,052 B1 * | 3/2001 | Miller | 705/31 |
| 6,446,048 B1 | 9/2002 | Wells | |
| 7,234,103 B1 | 6/2007 | Regan | |
| 7,272,633 B2 * | 9/2007 | Malik et al. | 709/206 |
| 7,742,958 B1 * | 6/2010 | Leek et al. | 705/31 |
| 7,917,411 B1 | 3/2011 | Bedell | |
| 2006/0178961 A1 | 8/2006 | Stanley et al. | |
| 2007/0136157 A1 | 6/2007 | Neher et al. | |
| 2007/0168861 A1 | 7/2007 | Bell et al. | |
| 2008/0249816 A1 | 10/2008 | Khalilian et al. | |
| 2009/0048903 A1 | 2/2009 | Lieberman | |
| 2009/0234720 A1 | 9/2009 | George et al. | |
| 2009/0287591 A1 | 11/2009 | Wyle et al. | |
| 2009/0307279 A1 | 12/2009 | Freedman | |
| 2010/0332362 A1 | 12/2010 | Ramsey et al. | |
| 2011/0137823 A1 | 6/2011 | Robb | |

OTHER PUBLICATIONS

Prosecution Papers in U.S. Appl. No. 12/239,413: Mar. 15, 2011 Non-Final Office Action; Jun. 7, 2011 Interview Summary; Jun. 13, 2011 Amendment; Oct. 5, 2011 Final Office Action; Jan. 5, 2012 Amendment; Jan. 23, 2012 Interview Summary.
Prosecution Papers in U.S. Appl. No. 12/612,596: Mar. 17, 2011 Non-Final Office Action; Jun. 8, 2011 Interview Summary; Jun. 13, 2011 Amendment; Aug. 4, 2011 Final Office Action; Aug. 10, 2011 Amendment; Dec. 7, 2011 Non-Final Office Action; Mar. 7, 2012 Amendment; Mar. 12, 2012 Interview Summary.
Prosecution Papers in U.S. Appl. No. 12/772,020: Dec. 22, 2011 Non-Final Office Action; Mar. 22, 2012 Amendment. Prosecution Papers in U.S. Appl. No. 12/771,622: Dec. 22, 2011 Office Action; Mar. 20, 2012 Interview Summary; Mar. 22, 2012 Amendment.
ProSeries® Online User Guide for Tax Year 2007, Chapter 13, "Entering Data on Forms and QuickEntry Sheets, Tracking information That Clients Haven't Provided Yet," http://http-download.intuit. com/http.intuit/CMO/proseries/resources/user_guide/ty07/index. htm (8 pages).

* cited by examiner

*Primary Examiner* — Ryan Zeender
*Assistant Examiner* — Denisse Ortiz Roman
(74) *Attorney, Agent, or Firm* — Vista IP Law Group LLP

(57) ABSTRACT

Collecting tax return data and integrating collected tax return data into a future electronic tax return. A computer in communication with a tax authority stores first year electronic tax return data of a user that prepared the tax return with a tax preparation application for that year. The computer sends a first electronic message such as an e-mail or text message to a communication device of the user asking whether data in the first year tax return has changed or to verify prior data. The user sends a response to the message using the communication device. Verified and changed data in the response may be stored for inclusion in an electronic tax return of the following or second year. The second year tax return may also be partially prepared utilizing the response from the user. Thus, when the user launches the tax preparation application for the second year, the electronic tax return for the second year is already partially completed to give the user a head start on preparing that electronic tax return.

27 Claims, 13 Drawing Sheets

METHODS SYSTEMS AND ARTICLES OF MANUFACTURE FOR COLLECTING DATA FOR FUTURE ELECTRONIC TAX RETURN

BACKGROUND

The invention is generally related to personal finance applications including tax preparation applications utilized to prepare electronic tax returns. Tax preparation applications have become very popular and allow a user, such as a taxpayer or a tax professional, to prepare and electronically file a tax return using a computer. Examples consumer and professional tax preparation applications that may be utilized for this purpose include TurboTax®, ProSeries® and Lacerte®, which are available from Intuit Inc., H&R Block TaxCut, available from H&R Block, Inc., Kansas City, Mo., and Tax-ACT®, available from $2^{nd}$ Story Software, Inc. TurboTax®, ProSeries® and Lacerte® are registered trademarks of Intuit Inc., and TaxACT® is a registered trademark of 2" Story Software, Inc.

Tax preparation applications present tax-related questions or data entry fields to the user as a series of interview pages, screens or fillable forms, in response to which the user enters the appropriate data or answers. Interview screens or questions may relate to personal and family information such as the name and social security number and information related life events of the user such as whether the user is married, has children, etc. Other interview screens and questions may relate the user's finances such as wages, retirement plan contributions, state and federal taxes that were paid or withheld as provided in Form-W2. Upon entry of the data, the tax preparation application prepares an electronic tax return, which is formatted as necessary and electronically filed with a tax authority such as the Internal Revenue Service, a state tax authority, or other tax collecting entity.

While tax preparation applications have greatly simplified preparation of tax returns, the manner in which data related to tax returns is collected and integrated into an electronic tax return can be improved. For example, the user of a tax preparation application will often have changes or events that occur in his or her life that will eventually require changes or updates to a prior year's tax return. When such changes or events occur, the user typically makes these changes while preparing the electronic tax return for the following year and well after these life events have occurred since the tax return for the following year may not be due for a number of months, e.g., not until the following April (in the United States). As a result, the user is required to enter all of the changes and updates at a later time, thereby resulting additional work for the user at that time despite the fact that life events that triggered these changes occurred well before the user began using the tax preparation application to prepare next year's tax return.

SUMMARY

One embodiment is directed to a method for managing or collecting data related to an electronic tax return. The method comprises sending a first message from a computer to a communication device of the user. The computer stores or has access to data related to a first electronic tax return of the user of a first year. The first message is related to a second electronic tax return of the user for a second year, which has yet to be prepared by the user with the tax preparation application for the second year. The method further comprises receiving, at the computer and from the communication device, first data related to the second electronic tax return to be prepared in response to the first message, and populating at least a portion of one or more forms, pages or sections of the second electronic tax return based at least in part upon the received first data before the user begins preparation of the second electronic tax return.

Another embodiment is directed to an article of manufacture comprising a computer program medium or carrier that is readable by a computer and that embodies one or more instructions that are executable by the computer to perform method steps comprising sending a first message from a computer to a communication device of the user, and receiving, at the computer and from the communication device, first data related to the second electronic tax return to be prepared in response to the first message, and populating at least a portion of one or more forms, pages or sections of the second electronic tax return based at least in part upon the received first data before the user begins preparation of the second electronic tax return.

A further embodiment is directed to a system for managing or collecting data to be included in an electronic tax return of a user of a tax preparation application. The system comprises a computer and tax data gathering program. The computer is in communication with a server of a tax authority through a first network and is also in communication with a communication device of the user through a second network. The computer stores or has access to data related to a first electronic tax return of the user of a first year that was prepared using the tax preparation application for the first year. The tax data gathering program executes on the computer and is executable to send a first message from the computer to the communication device of the user. The first message is related to a second electronic tax return of the user of a second year, which has yet to be prepared with the tax preparation application for the second year. The tax data gathering program is also executable to receive, at the computer and from the communication device, first data related to the second electronic tax return to be prepared in response to the first message, and to populate at least a portion of one or more forms, pages or sections of the second electronic tax return based at least in part upon the received first data before the user begins preparation of the second electronic tax return.

In one or more embodiments, an electronic interview of dialogue between the communication device of the user and the computer or tax data gathering program may involve a communication device such as a cellular telephone involve an electronic tax return that has yet to be prepared. In other words, the communications involve an electronic tax return that is to be prepared sometime in the future, e.g., for a future tax year or the next tax year. These communications may be in the form of electronic mail, text messages or other electronic message formats such as voice and video and can occur before and/or after the first or current year electronic tax return has been completed and filed with a tax authority. For example, a user may receive a communication from a tax data gathering program during a first or current year tax return while the user is still preparing the tax return for the first or current year or if the user required an extension of time to file the first tax return. Further, communications between the computer or tax data gathering program and the communication device of the user may occur even before the tax preparation application for the second year is available to the user and before the tax preparation application for the second year can be or is purchased by the user. As such, the user is not yet able to utilize the tax preparation application for the second year to begin preparing the second or future year tax return, but the communications are related to the second year electronic tax return to be prepared. Thus, the user may submit data, through one or multiple responses at various times, to be incorporated into a second or next year electronic tax return before the tax preparation application for that year is even created, available or utilized.

Data received from the user may confirm that data from a first electronic tax return (e.g., a current or prior year tax return) also applies to a second or future year tax return. Data received from the user may also indicate that certain data in a first tax return has changed or that a certain life event or change in the life of the user has occurred, e.g., the user has moved, sold or purchased a house or other property, was married, divorced or widowed, has a new job, became unemployed, had a child or other dependent, gave to a charity, gained or lost a source of income, has a different employer, has different tax deductions or investments, etc. These changes or updates may be stored and incorporated into the electronic tax return for the following or second tax year, e.g., when the tax preparation application for the following or future year becomes available or when the user launches the tax preparation application for the second year to begin preparing the electronic tax return for the second year. In this manner, the tax data gathering program, which may be part of a tax preparation application for the following year or a separate program associated with a tax preparation application, may be operable to complete or partially complete one or more forms, pages or sections of a second or future year electronic tax return based on prior data, data corrections or updates and data verifications that are sent by the user in response to messages or questions sent by the tax data gathering program. Thus, preparation of an electronic tax return for the second or future year can begin, or data related to the electronic tax return for the second year can be collected and stored, based on one or more responses to one or more questions presented to the user outside of questions or interview screens typically presented to a user when utilizing a tax preparation application. For example, electronic messages or queries can be sent periodically (e.g., every few days, once a week or once a month) to the communication device of the user, and the user can respond these messages at that time, intermittently, or at his or her convenience before beginning preparation of a future electronic tax return.

Further, beginning preparation of a second or future year tax return by populating one or more pages, forms or sections of one or more tax return forms may be performed by the tax data gathering program (or the tax preparation application of which the tax data gathering program is a part) with or without knowledge of the user of the tax preparation application. Thus, at a later time when the user launches the tax preparation application to begin working on the electronic tax return for the second year, the electronic tax return for the second year is already partially completed.

BRIEF DESCRIPTION OF THE DRAWINGS

The foregoing and other aspects of embodiments are described in further detail with reference to the accompanying drawings, wherein.

DETAILED DESCRIPTION OF ILLUSTRATED EMBODIMENTS

Figure 1:
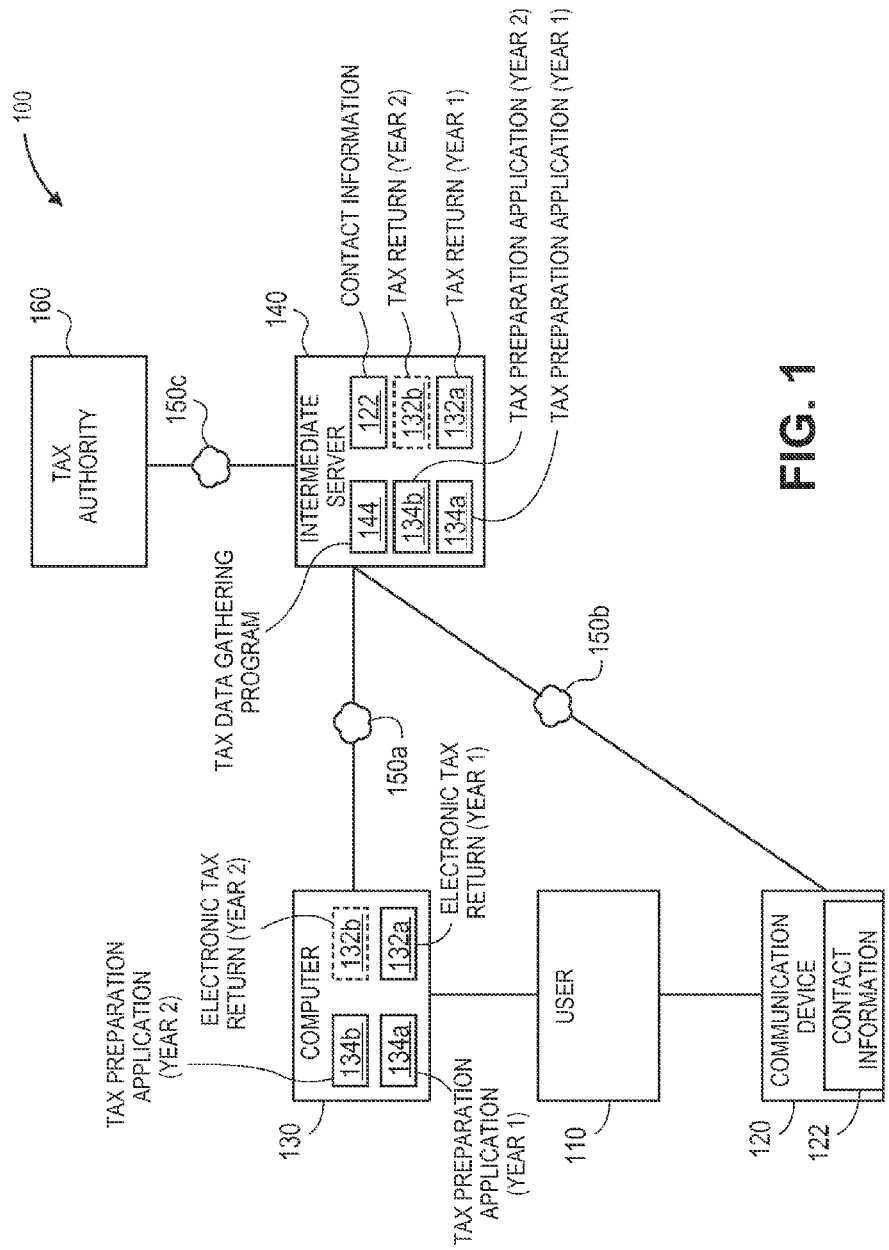
FIG. 1 illustrates a system constructed according to one embodiment for managing data related to a future electronic tax return.

Embodiments are related to confirming and updating data of a prior electronic tax return, storing confirmed and updated data for incorporation into a future electronic tax return that has not yet been prepared and/or incorporating confirmed and updated data into a future electronic tax return that has not yet been prepared, e.g., by completing at least a portion of a form, page or interview screen of a future electronic tax return. Embodiments may be operable to perform these functions before the user prepares an electronic tax return, before a tax preparation application for preparing the future electronic tax return is even available and/or purchased, downloaded or launched by the user, and before the user receives any fauns that are required to complete an electronic tax return.

With embodiments, the user is electronically interviewed regarding data to be included in a future electronic tax return.

A tax data gathering program sends one or more messages or communications, which may be sent periodically or at various times, to a communication device of a user asking whether data in a first (current or prior) electronic tax return has changed such that these changes should be incorporated into a second (next or future) electronic tax return. The user can respond to these messages by confirming that certain data has not changed and applies to the second electronic tax return (e.g., the user has the same address and is still employed by the same company) and/or by providing updated or new data that should be included in the second electronic tax return but not the prior, first electronic tax return (e.g., the user is no longer single and was recently married or recently had a child). The unchanged or confirmed data and the new or updated data can be collected and stored by the tax data gathering program such that when the user launches the tax preparation for the following year, the unchanged or confirmed and the new or updated data that was the subject of the user's prior responses can be used to populate related tax forms, pages and interview screens. In this manner, embodiments allow the electronic tax return for the following year to already be partially prepared when the user launches the tax preparation application to begin a new electronic tax return, thereby reducing the amount of work that must be done by the user at that time.

Communications between a tax data gathering program and a communication device of a user can occur before a second or future tax preparation application is even launched and, in some cases, even before the tax preparation application is available and before any forms or data for the future electronic tax return are received, are used to collect and store electronic tax return data for the following year, partially complete a form, page or interview screen and/or partially complete an electronic tax return for the following year to provide the user a head start on the future electronic tax return, make preparation of the electronic tax return more convenient, and reduce the time that is required to fill out forms or interview pages with information that is known before the tax preparation application is launched to begin preparation of the future electronic tax return. For example, by answering simple questions, about 5-40% (or other percentages as applicable) of a future electronic tax return can be completed before the user even launches the tax preparation application for that electronic tax return and before the user even receives data and forms for the future electronic tax return.

Embodiments also provide for enhanced customer loyalty and tax preparation consistency as a result of users utilizing the same tax preparation application for different years, thereby allowing the tax preparation application for a future year to integrate other data from a prior year electronic tax return, thus making preparation of a future electronic tax return even easier, faster and more convenient for a user. Further aspects of embodiments are described with reference to FIGS. 1-13.

Referring to FIG. 1, a system 100 constructed according to one embodiment for collecting and incorporating tax data into a future electronic tax return involves a data input, computing or communication device 120 (generally referred to as communication device 120) of a user 110 of an office or business, home or client computer 130 (generally referred to as computer 130), an intermediate or electronic filing server 140 (generally referred to as intermediate server 110) and a tax authority server 150.

The user 110 may be an individual, a tax professional or other user (generally referred to as user 130) that prepares an electronic tax return 132a for a first or current year, Year 1, utilizing a tax preparation application or program 134a (generally tax preparation application 134) for Year 1. For example, the user 110 may prepare an electronic tax return 132a for 2009, i.e., the tax year ending Dec. 31, 2009 (Year 1), the electronic tax return 132a to be filed by Apr. 15, 2010 utilizing a tax preparation application 134a such as TurboTax® for 2009. While embodiments may be utilized for electronic tax returns for various other years, 2009 as Year 1 is provided as an illustrative example since embodiment may apply to various tax years.

Further, embodiments may involve various consumer and professional tax preparation applications 134 including, for example, TurboTax®, ProSeries® and Lacerte®, which are available from Intuit Inc., H&R Block TaxCut, available from H&R Block, Inc., Kansas City, Mo., and TaxACT®, available from $2^{nd}$ Story Software, Inc. Examples of personal finance applications that may be utilized include Quicken®, quickenonline.com, QuickBooks® and FinanceWorks®, which are also available from Intuit Inc., Microsoft Money, which is available from Microsoft Corporation, Redmond, Wash. and personal finance applications available from Mint Software, Inc. and Wesabe, Inc. Quicken®, QuickBooks® and FinanceWorks® are registered trademarks of Intuit Inc. It should be understood that embodiments may utilize other tax preparation applications 134 and other personal finance applications as necessary. For ease of explanation, reference is made generally to a tax preparation application 134.

The user 130 prepares the electronic tax return 132a for Year 1 using the computer 140 by entering data in response to various interview screens and fillable forms that are presented by the tax preparation application 134a to the user 110. For this purpose, the user 110 may enter data manually or import the data into the electronic tax return 142a from another program such as a personal finance application or spreadsheet.

The intermediate server 140 and the computer 130 are operably coupled to or in communication with each other through a network 150a, and the intermediate server 140 and the communication device 120 are operably coupled to or in communication with each other through a network 150b. The intermediate server 140 is also operably coupled to or in communication with a server 160 of a tax authority (generally tax authority 160) such as a federal tax authority (e.g., Internal Revenue Service), a state tax authority (e.g., State Franchise Board of California) or other tax collecting entity through a network 150c.

According to one embodiment, the intermediate server 140 may serve as a "clearing house" for an electronic tax return 132a that is prepared and ready to be transmitted to or electronically filed with the tax authority 160, to process acknowledgements and other data received by the tax authority 160 and to route related information back to the user or tax preparer 110. One example of intermediate or electronic server 140 that may be utilized for these purposes is a server of Intuit Inc., e.g., a server of the Intuit Electronic Filing Center. Other examples of intermediate or electronic filing servers 140 include electronic filing servers utilized by TaxCut and TaxACT® tax return preparation applications. For this purpose, as shown in FIG. 1, the intermediate server 140 is also operably coupled to or in communication with the tax authority server 160 through one or more suitable networks 150c.

Each of the networks 150a-c and other networks discussed herein (generally network 150) may be different, or two or more networks 150 may be the same depending on the system configuration and communication protocols employed. One or more or all of the networks 150 may be, for example, a cellular network, a wireless network, a Local Area Network (LAN) and/or a Wide Area Network (WAN) or a combination of networks. Thus, reference to a network 150 generally is not intended to refer to a specific network or communications protocol, and it should be understood that embodiments can be implemented using various networks and combinations thereof.

As shown in FIG. 1, the intermediate server 140 stores or has access to the electronic tax return 132*a* for Year 1 prepared by the user 110 and related contact information 142 of the user 110. The contact information 142 may be an e-mail address of the user 110. The e-mail address may be provided by the user 110 for purposes of communicating with the intermediate server 140 to transmit the electronic tax return 132 to the intermediate server 140 and to receive other related communications such as electronic filing confirmations. This type of contact information 142 may be utilized when, for example, the user 110 prepares the electronic tax return 132 utilizing an on-line version of the tax preparation application 134*a*. The contact information 142 may also be a telephone or cellular telephone number of the user 110, which may be provided by the user 110 during preparation of an electronic tax return 132*a* utilizing a desktop or on-line version of the tax preparation application 134*a*.

Figure 2:
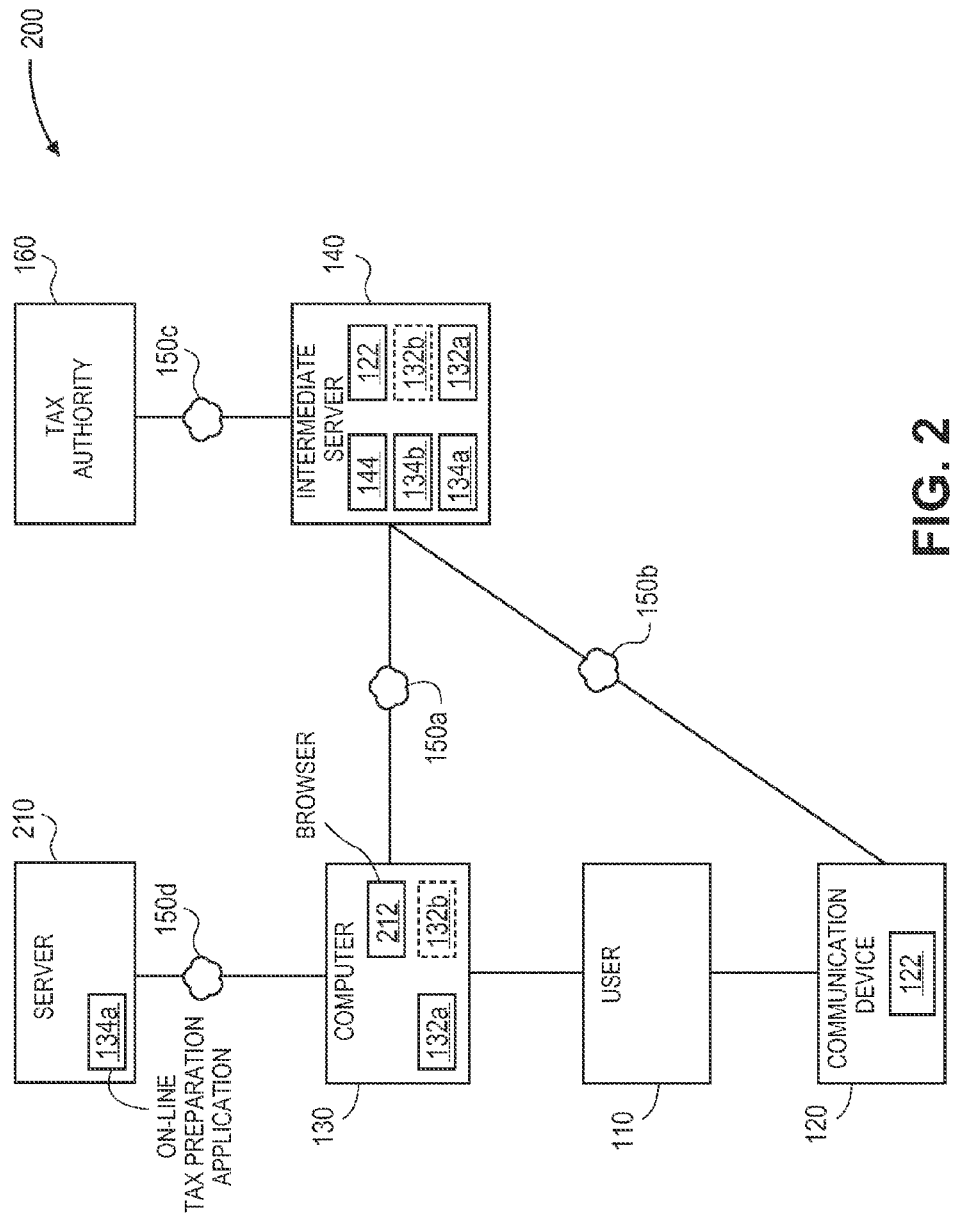
FIG. 2 illustrates a system constructed according to another embodiment that involves an on-line tax preparation application.
Figure 3:
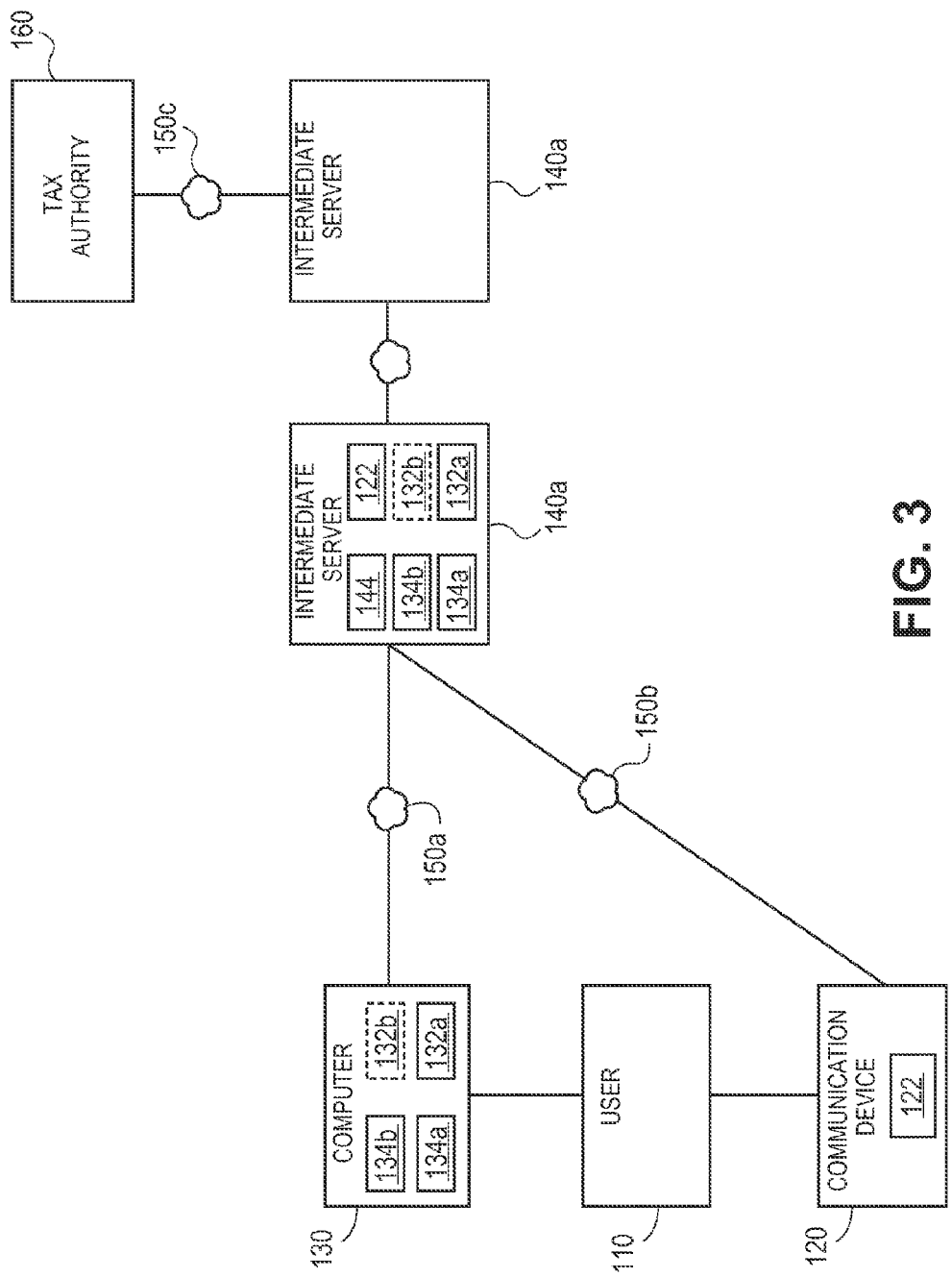
FIG. 3 illustrates a system constructed according to another embodiment that involves multiple intermediate servers for preparing, formatting and filing an electronic tax return with a tax authority.

It should be understood that embodiments may involve the system 100 illustrated in FIG. 1 and other system configurations including the system 200 illustrated in FIG. 2 that involves an on-line version of the tax preparation application 134*a*. For example, as shown in FIG. 2, the user computer 130 is operably coupled to or in communication with a computer or server 210 that hosts an on-line version of the tax preparation application 134*a*. The on-line version of the tax preparation application 134*a* can be accessed using a web browser 212 that executes on the computer 130. Further, the tax preparation application 134*a* may reside on the intermediate server 140. As shown in FIG. 3, one or multiple intermediate servers 140 may also be utilized in embodiments. For example, as shown in FIG. 3, a first intermediate server 140*a* may be used for receiving, storing and transmitting tax return data and sending a completed tax return 132*a* for Year 1 to the second intermediate server 140*b* that is in communication with the first intermediate server by a network 150*d*. The second intermediate server 140*b* is configured or programmed to format an electronic tax return 132 as necessary and electronically file the completed electronic tax return 132 with the tax authority 260. Thus, it should be understood that system and method embodiments described in further detail below may involve desktop and on-line versions of a tax preparation application 132 and various system configurations.

Referring again to FIG. 1, for example, according to embodiments, the intermediate server 140 includes or has access to a tax data gathering program 144, which is operable to collect data to be stored and/or incorporated into a future electronic tax return 132*b* (generally illustrated by dotted line 132*b*) before the user 110 begins preparation of the electronic tax return 132*b*. Continuing the example discussed above, Year 1 is the tax year ending Dec. 31, 2009, and Year 2 is the tax year ending Dec. 31, 2010 and the electronic tax return 132*b* for Year 2 is to be filed by Apr. 15, 2011. Thus, the tax preparation application 134*a* is used to prepare the electronic tax return 132*a* for Year 1, and the tax preparation application 134*b* is used to prepare the electronic tax return 132*b* for Year 2 in the future.

As shown in FIG. 1, the tax data gathering program 144 resides and executes on the intermediate server 140. The tax data gathering program 144 may also execute on another computer associated with or in communication with the intermediate server 140. Thus, a tax data gathering program 144 residing on the intermediate server 140 is defined to include the tax data gathering program 144 residing and executing on the intermediate server 140 and to include the tax data gathering program 144 residing and executing on a computer or server associated with the intermediate server 140 such that the intermediate server 140 is provided with data or results of execution of the tax data gathering program 144.

Figure 4B:
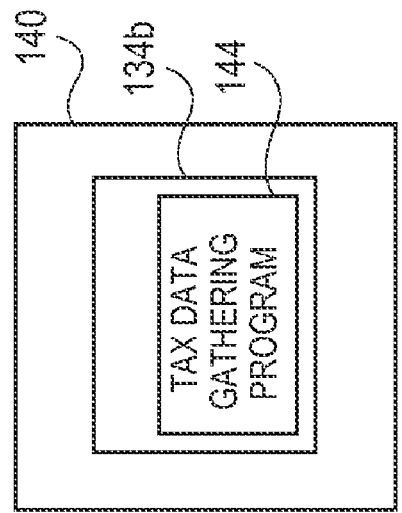
FIG. 4b illustrates that a tax data gathering program may be a part of a tax preparation application.
Figure 4A:
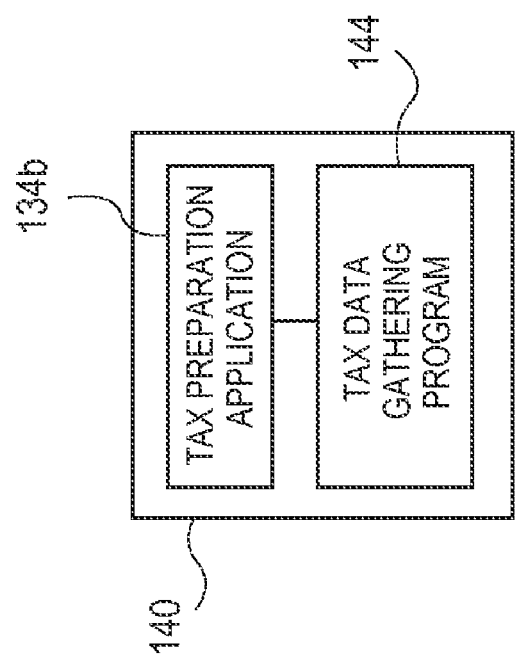
FIG. 4a illustrates that a tax data gathering program may be separate from but related to a tax preparation application that is used to prepare and file an electronic tax return.

Referring now to FIG. 4A, the tax data gathering program 144 may reside and/or execute on the intermediate server 140 and be separate program that is used with a tax preparation application 134*b* for Year 2 that is to be used to prepare a future electronic tax return 132*b* for Year 2. In another embodiment, as shown in FIG. 4B, the tax data gathering program 144 is part of the tax preparation application 134*b* that is to be utilized to prepare the future electronic tax return 132*b* for Year 2. Thus, FIGS. 1-4B are provided for purposes of illustration and explanation, not limitation, and it should be understood that various system and software configurations may be utilized to implement embodiments.

Figure 5:
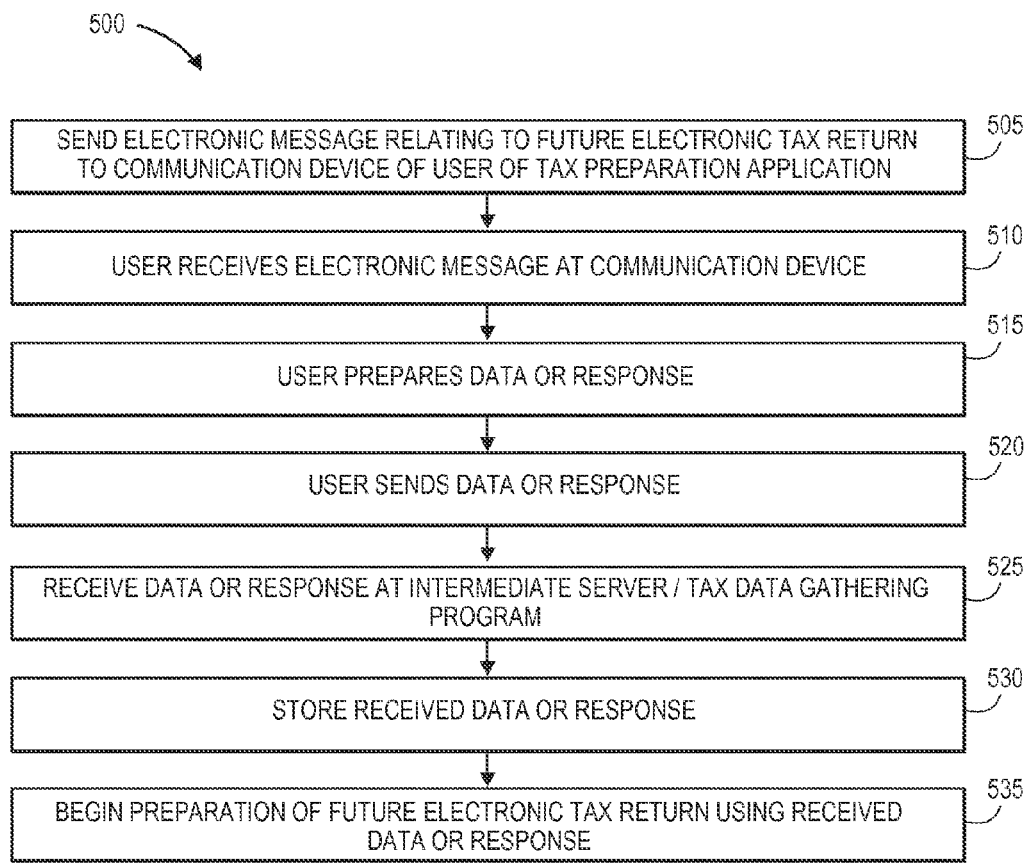
FIG. 5 is a flow diagram of one embodiment of a method for managing data to be included in a future electronic tax return and that involves communication between a communication device of a user and an intermediate server or tax data gathering program.
Figure 6:
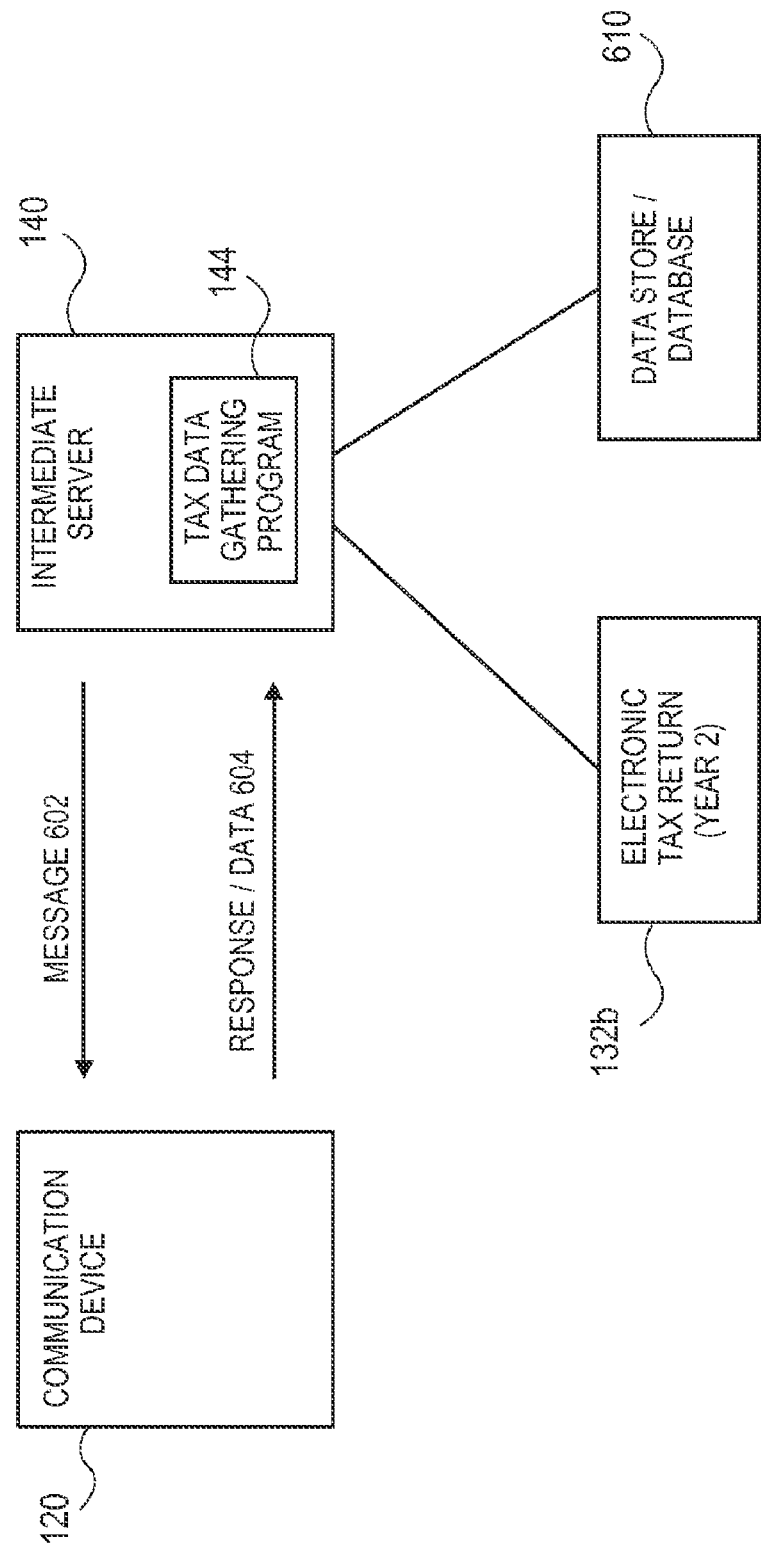
FIG. 6 further illustrates communication between a communication device of a user and an intermediate server or tax data gathering program.

Referring to FIG. 5, and with further reference to FIG. 6, a method 500 for managing data related to an electronic tax return 132*b* to be prepared in the future or for Year 2 comprises sending an electronic message 602 relating to future electronic tax return 132*b* from a computer, intermediate server or tax data gathering program 144 (generally, from the intermediate server 140 or from tax data gathering program 144) to the communication device 120 of user 110 of the tax preparation application 134*a* for Year 1 at stage 505.

According to one embodiment, communications between the intermediate server 140 and the communication device 110 are by electronic mail, and the message 602 is sent to e-mail address contact information 142 that was provided by the user 110 during preparation and/or filing of the first electronic tax return 132*a* for Year 1 utilizing the tax preparation application 134*a*. The user 110 may also provide another e-mail address for use in embodiments.

According to another embodiment, communication between the intermediate server 140 and the communication device 110 is in the form of a text or Short Message Service (SMS) message that is sent to telephone number contact information 142 that was provided by the user 110. The user 110 may also provide another telephone number for use in embodiments. For this purpose, the communication device 110 may be a mobile communication device such as a cellular telephone, a smartphone, a personal digital assistant or a laptop computer. Examples of communication devices that may be utilized for this purpose include a PDA such as a BlackBerry® and an iPhone available from Apple Inc., BlackBerry® is a registered trademark of Research In Motion Limited Corporation.

The communication device 110 may also be a non-mobile communication device or a device that is not designed to be carried by the user 110 such as a desktop computer at the user's home or office. As shown in various figures, the communication device 120 and the computer 110 are different devices, but the communication device 120 may also be the computer 110. Embodiments may also involve multiple types of communications and different and multiple types of communication devices 120. For ease of explanation, reference is made generally to a message 602 that is generated and sent by the tax data gathering program 144, and sent from the intermediate server 140 to the communication device 120 through a network 150.

At stage 510, the user 110 receives the electronic message 602 at the communication device 120 in the form of an e-mail, text message or other suitable message format. Further, an e-mail may open to or include a link to a web page or fillable form. According to one embodiment, the message 602 relates to certain life events that may result in a change in the electronic tax return 132b for Year 2 compared to the electronic tax return 132a for Year 1. For example, the message 602 may relate to personal and/or life event information such as a name of the user 110 or change of name of the user 110 or someone in the user's family, a marital status (e.g., whether the user 110 is still married, widowed, separated or divorced), an employment status (e.g., whether the user 110 is still employed or unemployed), a child (e.g., whether the user 110 recently had a child), a spouse (e.g., whether the user 110 was recently married), a dependent (e.g., whether the user 110 has the same dependents or different numbers of dependents), a charity (e.g., whether the user 110 continues to contribute to a charity), a source of income or an employer (e.g., whether the user 110 is still employed by the same employer), a tax deduction (e.g., whether the user has the same deductions such as a deduction for children, and a house or retirement contributions). It should be understood that the message 602 may relate to various changes in the life of the user 110 and/or various family members of the user 110. Thus, the examples provided above are provided for purposes of explanation and in a non-limiting manner.

At stage 515, the user 110 prepares a response or data 604 that may be in the form of an e-mail (which may include a web page or fillable form), a text or SMS message or other suitable message format. At stage 520, the user 110 sends the data or response 604 to the intermediate server 140, which receives the data or response 604 at stage 525. At stage 530, according to one embodiment, the received data or response 604 is stored, e.g., at the intermediate server 140, at another computer, or at an a data store, memory or database 610 (generally database 610) that is associated with the intermediate server 140 or tax data gathering program 144 as shown in FIG. 6. Alternatively, or additionally, at stage 535, the tax data gathering program 144 may begin preparation of the future or Year 2 electronic tax return 132b based at least in part or using the received data or response 604, e.g., by completing at least a portion of one or more pages, forms or interview screens of the future or Year 2 electronic tax return 132b, which may be generated by a tax preparation application 134b for Year 2 that can be accessed by the tax data gathering program 144. The tax preparation application 134b for Year 2, however, may or may not be available to the public and thus, may or may not be available for purchase and use by the user 110.

In this manner, with embodiments, the tax data gathering program 144 can be used to begin preparation of a future electronic tax return 132b for the following Year 2 before the user 110 even begins working on the electronic tax return 132b for Year 2. As a result, the user 110 may not even know that this work on the future electronic tax return 132 has begun. Thus, when the user 110 eventually purchases and launches the tax preparation application 134b for Year 2, the user 110 is pleasantly surprised by the tax preparation application 134b for Year 2 informing the user 110 that various forms or pages of the electronic tax return 132b for Year 2 have already been completed or partially completed based on the user's prior data or response 604.

In the embodiment illustrated in FIGS. 5-6, one message 602 is sent from the tax data gathering program 144 on the intermediate server 140 to the communication device 120, and one response 604 is sent from the communication device 120 back to the tax data gathering program 144. The message 602 and response 604 may be related to a particular type of data or a particular data item or to multiple types of data or multiple data items. In other words, a single message 602 and response 604 may involve multiple questions relating to the electronic tax return 132b for Year 2 and/or ask the user 110 to verify that one or more data items for the electronic tax return 132b for Year 2 are the same as the corresponding data items in the electronic tax return 132a for Year 1. Other embodiments may involve multiple messages 602 and/or responses 604, each of which may address one or multiple topics or questions.

Figure 7:
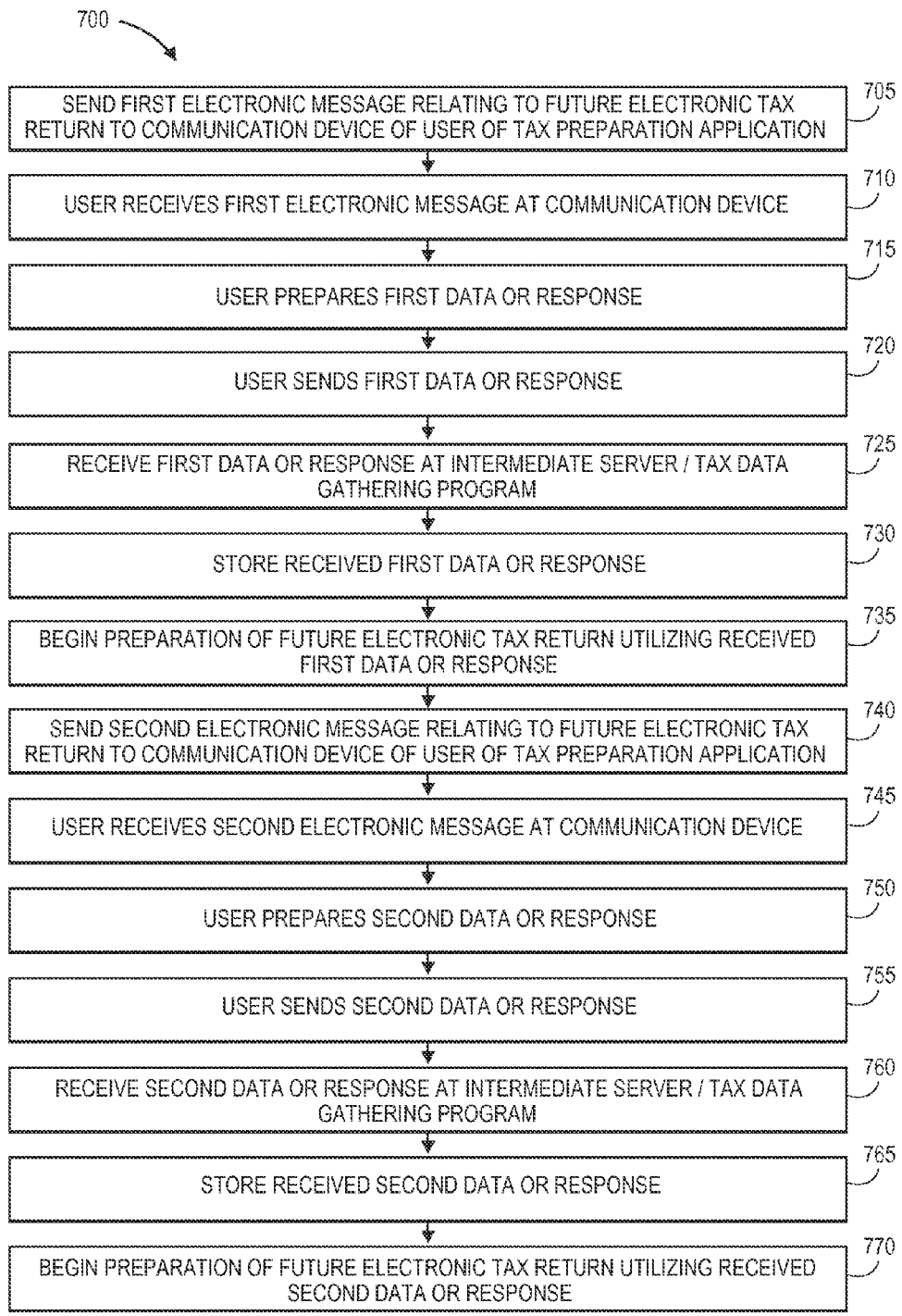
FIG. 7 is a flow diagram of one embodiment of a method for managing data to be included in a future electronic tax return and that involves multiple messages and responses thereto transmitted between a communication device of a user and an intermediate server or tax data gathering program.
Figure 8:
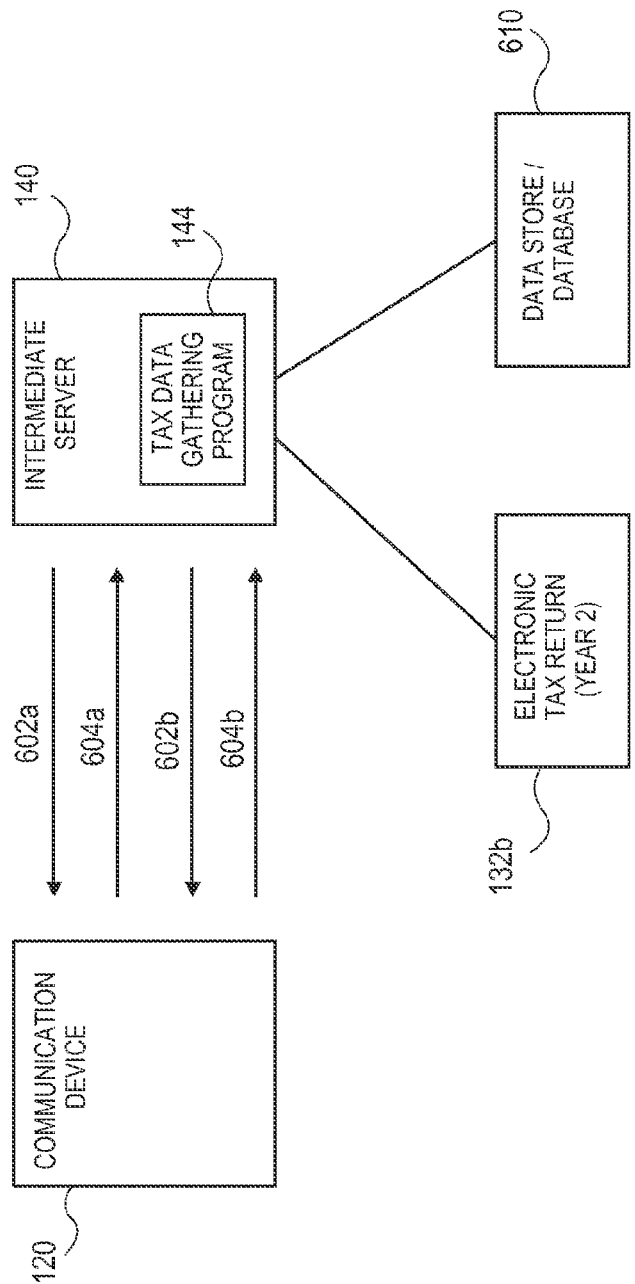
FIG. 8 further illustrates multiple messages and responses thereto transmitted between a communication device of a user and an intermediate server or tax data gathering program.

For example, referring to FIG. 7, and with further reference to FIG. 8, a method 800 for managing data related to an electronic tax return 132b to be prepared in the future or for Year 2 comprises steps that are the same as or similar to steps discussed above with reference to FIGS. 5-6 including sending a first electronic message 602a relating to future electronic tax return 132b from the intermediate server 140 to the communication device 120 of user 110 of the tax preparation application 134a for Year 1 at stage 705, the user 110 receiving the first electronic message 602a at the communication device 120 in the form of an e-mail, text message or other suitable message format, the user 110 preparing a first response or data 604a at stage 715, the user 110 sending, at stage 720, the first data or response 604a to the intermediate server 140, which receives the first data or response 604a at stage 725, storing the first received data or response 604a at stage 730, e.g., at the intermediate server 140, at another computer, or at an a database 610. Alternatively, or additionally, at stage 735, the tax data gathering program 144 may begin preparation of the future or Year 2 electronic tax return 132b based at least in part or using the first received data or response 604a, e.g., by completing at least a portion of one or more pages, forms or interview screens of the future or Year 2 electronic tax return 132b, which may be generated by a tax preparation application 134b for Year 2 that can be accessed by the tax data gathering program 144. The tax preparation application 134b for Year 2, however, may or may not be available to the public and thus, may or may not be available for purchase and use by the user 110.

At stage 740, a second electronic message 602b relating to future electronic tax return 132b is sent from the intermediate server 140 to the communication device 120 of user 110, and at stage 745, the user 110 receives the second electronic message 602b at the communication device 120 in the form of an e-mail, text message or other suitable message format. At stage 750, the user 110 prepares a second response or data 604b, and at stage 755, the user 110 sends the second response or data 604b which, at stage 760, is received by the intermediate server 140. At stage 765, the received second data or response 604b is stored and/or at stage 770, the tax data gathering program 144 may begin preparation of the future or Year 2 electronic tax return 132b based at least in part or using the first received data 604a and the second received data 604b.

As shown in FIGS. 7-8, there may be two messages 602a, 602b and two responses 604a, 604b that are exchanged between the intermediate server 140 and the communication device. Other embodiments may involve three, four, five, six and other numbers of exchanges. The exchanges may occur at various times and messages may be sent from the intermediate server 140 at various times, e.g. periodically.

Figure 9:
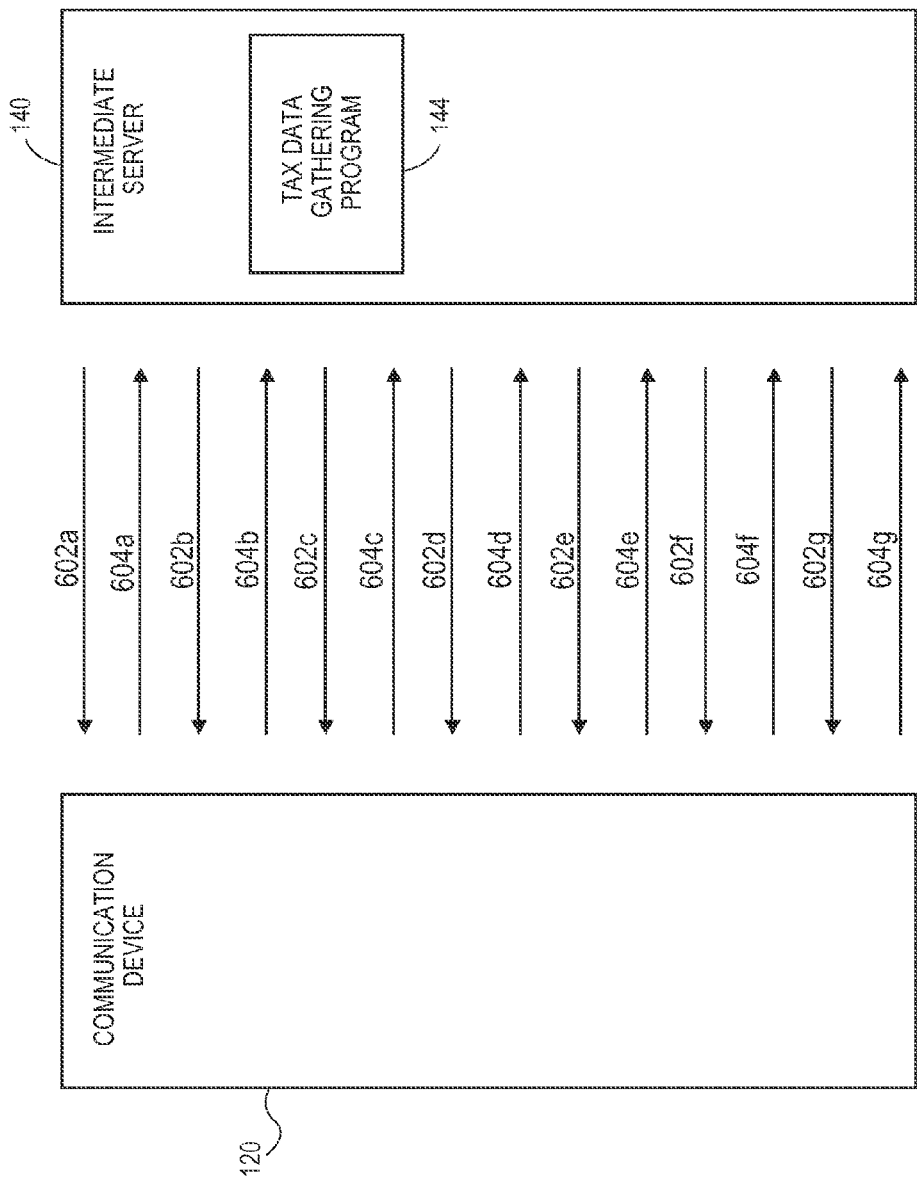
FIG. 9 further illustrates various other messages and responses thereto transmitted between a communication device of a user and an intermediate server or tax data gathering program.

For example, referring to FIG. 9, a first message 602a generated by the tax data gathering program 144 is sent from the intermediate server 140 to the communication device 120 and may ask the user 110 to confirm whether the user 110 is still married (e.g., as indicated on the electronic tax return 132a for Year 1). In response, the user 110 enters "Y" (e.g., in the form of an e-mail message, text message, utilizing a web page or other suitable data entry format) to indicate that the user 110 is still married. This data or response 602 is then sent to the tax data gathering program 144. The tax data gathering program 144 may then generate another message 602b that is sent to the communication device 120 and that asks the user 110 to confirm whether there are any newborn children. In response, the user 110 may enter "Y" to indicate that a baby was recently born. This data or response 604b is then sent to the tax data gathering program 144, which may then generate yet another message 602c requesting the name of the baby. This third message 602c is sent to the communication device, and the user 110 generates third data or a third response 604c that is sent back to the tax data gathering program 144. The tax data gathering program 144 may then ask in a fourth message 602d whether the user 110 is still as the same address or residence, and the user enters and sends an appropriate fourth response 604d which, in the illustrated example, is "Y". The tax data gathering program 144 may then ask in a fifth message 602e whether the user 110 is still employed by the same company, and the user 110 enters and sends an appropriate fifth response 604e which, in the illustrated example, is "N" Upon receiving an indication that there has been a change in employment, the tax data gathering program 144 may then ask in a sixth message 602f that is sent to the communication device that the user 110 provide the name of the new employer.

Thus, as shown in FIG. 9, the user 110 may engage in an ongoing electronic interview or dialogue with the tax data gathering program 144 depending on the answers provided by the user 110 in order to confirm or update information that was entered in a prior year tax return 132a for Year 1 and to provide new information related to an electronic tax return 132b for Year 2 that has yet to be prepared. For this purpose, the tax data gathering program 144 can be programmed to engage in a question-answer tree such that a certain response 604 to one question or message 602 may lead to another question or message 604 or series of questions or messages 604. Further, questions or messages 602 can be sent by the tax data gathering program 144 intermittently or periodically, e.g., once per day, once every few days, once per week, once every two weeks, and once per month. The user 110 may respond periodically or intermittently. The tax data gathering program 144 can also be configured to send a reminder to the user 110 to respond to the message 602 in the event that a pre-determined time has elapsed since a message 602 was sent to the communication device 120. The confirmed, updated and new information acquired by one or more responses 603 can be stored and/or incorporated into the electronic tax return 132b for the following Year 2.

This dialogue or exchange of one or more messages 602 and related responses 604 may occur at various times relative to preparation of a prior or current year electronic tax return 132a for Year 1 and relative to various stages of development, release and availability of a tax preparation application 134b for Year 2 that is used to prepare the electronic tax return 132b for Year 2.

Figure 10:
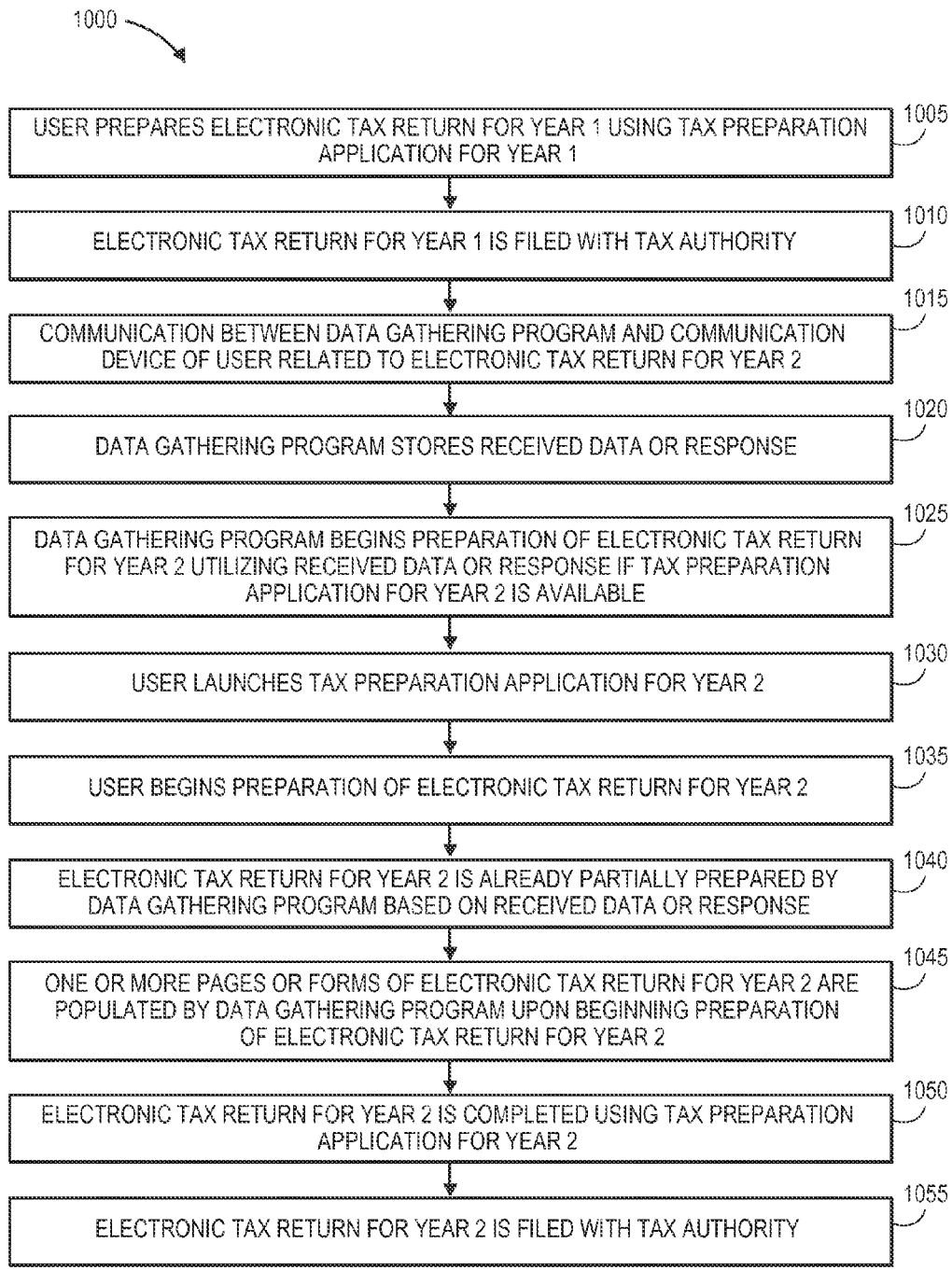
FIG. 10 is a flow diagram of one embodiment of a method for managing data to be included in a future electronic tax return and that involves communications between a communication device of a user and an intermediate server or tax data gathering program that occur after a prior electronic tax return has been filed.

For example, referring to FIG. 10, a method 1000 for managing data related to a future electronic tax return 132b comprises, at stage 1005, the user 110 preparing an electronic tax return 132a for a first or current year (Year 1) using a tax preparation application 134a for Year 1. At stage 1010, the completed electronic tax return 132a for Year 1 is filed with tax authority 160 utilizing the intermediate server 140. At stage 1015, one or more communications related to future electronic tax return 132b for Year 2 are generated by the tax data gathering program 144 and exchanged between the intermediate server 140 and the communication device 120 of the user 110. At stage 1020, the tax data gathering program 144 stores received data or responses 604 and/or begins preparation of an electronic tax return 132b for Year 2 at stage 1025 if a tax preparation application 134b for Year 2 is available to the tax data gathering program 144. At stage 1030, the user 110 launches the tax preparation application 134b for Year 2. The user 110 may purchase the tax preparation application 134b for Year 2 or download it onto the computer 130 if an on-line version of the tax preparation application 134b (e.g., as shown in FIG. 2) is utilized. At stage 1035, the user 110 begins preparation of the electronic tax return 132b for Year 2.

In certain embodiments, the electronic tax return 132b for Year 2 is already partially prepared by the tax data gathering program 144 based on one or more received data or responses 604. In other embodiments, at stage 1040, one or more pages or forms of electronic tax return 132b for Year 2 are populated by the tax data gathering program 144, e.g., upon the user 110 beginning preparation of the electronic tax return 132a for Year 2. At stage 1045, the tax preparation application 134b for Year 2 may integrate other data from the prior electronic tax return 132a for Year 1 into the electronic tax return 132b for Year 2. For example, other data that was not the subject of messages 602 and responses 604 involving the data gathering program 144 but that has not changed and can be carried over from the electronic tax returns 132a for Year 1 to the electronic tax return 132b for Year 2. At stage 1050, the electronic tax return 132b for Year 2 is completed using the tax preparation application 134b for Year 2, and at stage 1055, the electronic tax return 132b for Year 2 is filed with the tax authority 160.

Thus, in the embodiment illustrated in FIG. 10, the tax data gathering program 144 is operable to acquire tax return data related to the next or following year (Year 2) after the electronic tax return 132a for the prior/current year (Year 1) has been filed, but before the user 110 begins preparation of the next electronic tax return 132b for Year 2.

Figure 11:
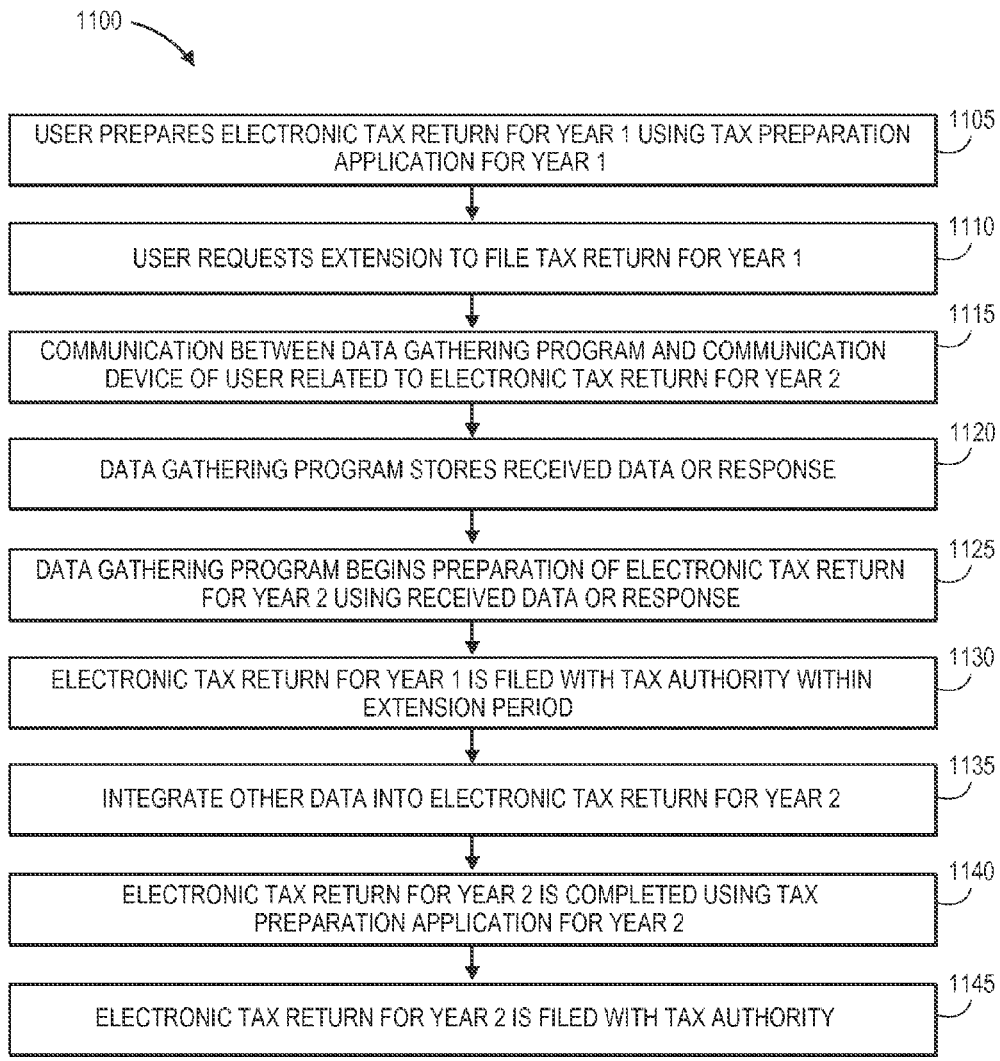
FIG. 11 is a flow diagram of one embodiment of a method for managing data to be included in a future electronic tax return and that involves communications between a communication device of a user and an intermediate server or tax data gathering program that occur before a prior electronic tax return has been filed.

Referring to FIG. 11, embodiments may also be utilized to confirm or verify tax return data for Year 2, or to obtain new or updated data for Year 2, before an electronic tax return 132a for Year 1 is filed. In the illustrated embodiment, a method 1100 for managing data related to a future electronic tax return 132b comprises, at stage 1105, the user 110 preparing the electronic tax return 132a for Year 1 using a tax preparation application 134a for Year 1, and the user 110 requesting an extension of time to file the electronic tax return 132a for Year 1 at stage 1110. For example, if the current electronic tax return 132a for Year 1 (2009) is to be filed by Apr. 15, 2010, the user 110 may request an extension of time to file the electronic tax return 132a for Year 1 (2009) by Oct. 15, 2010. At stage 1115, one or more messages 602 and responses 604 related to the electronic tax return 132b for 2010 (Year 2) are exchanged between the tax data gathering program 144 and the communication device 120 of the user 110. Thus, the electronic tax return 132b for Year 2 is not yet prepared. At stage 1120, the tax data gathering program 144 stores received data or responses 604 and/or at stage 1125, begins preparation of the electronic tax return 132b for Year 2 using received data or response 604.

At stage 1130, the electronic tax return 132 for Year 1 (2009 in this example) is filed with the tax authority 160 through the intermediate server 140 within extension period. At stage 1135, the tax preparation application 134b for Year 2 may integrate other data from the prior electronic tax return 132a for Year 1 into the electronic tax return 132b for Year 2 if the other data has not changed and can be carried over from the electronic tax returns 132a for Year 1 to the electronic tax return 132b for Year 2. At stage 1140, the electronic tax return 132b for Year 2 is completed using the tax preparation application 134b for Year 2 and filed with the tax authority 160 through the intermediate server 140 at stage 1145.

Thus, in the embodiment illustrated in FIG. 11, the tax data gathering program 144 is operable to acquire tax return data related to the next or following year (Year 2) before the electronic tax return 132a for the prior/current year (Year 1) has been filed (e.g., as a result of an extension), and before the user 110 begins preparation of the electronic tax return 132b for the following Year 2.

Further, in certain embodiments, the tax data gathering program 144 is operable to populate one or more pages or forms of the electronic tax return 132b for Year 2 and monitor the status of completion of the electronic tax return 132b. If the deadline to file the electronic tax return 132, e.g., April 15$^{th}$, is approaching or is within a certain number of days, the tax data gathering program 144 or the tax preparation application 134b can send a message to the communication device 120 regarding whether the tax data gathering program 144 or the tax preparation application 134b should file an extension of time. The user may respond to this message indicating whether or not the extension should be filed utilizing the tax data gathering program 144 or the tax preparation application 134b.

Figure 12:
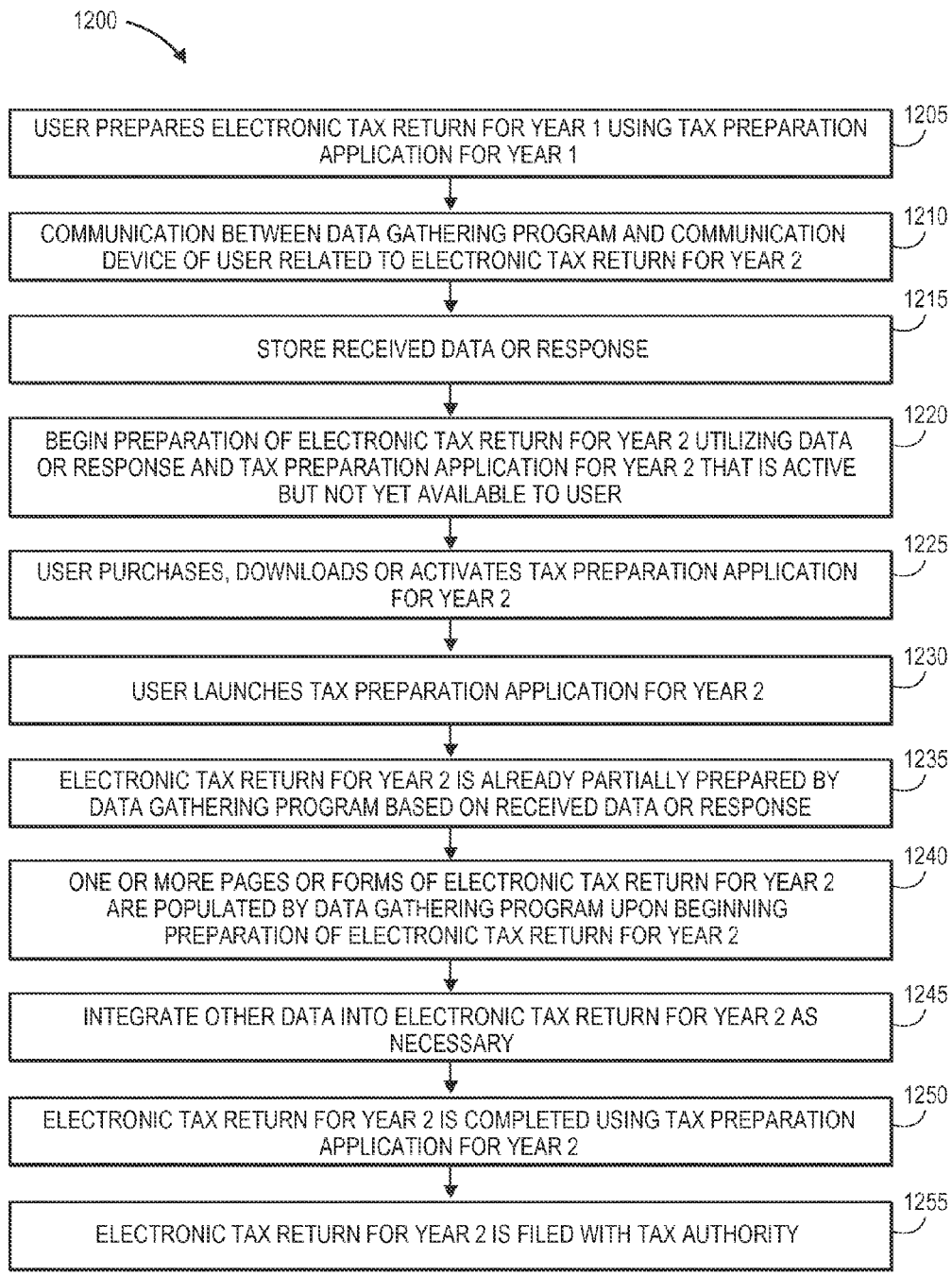
FIG. 12 is a flow diagram of one embodiment of a method for managing data to be included in a future electronic tax return and that involves communications between a communication device of a user and an intermediate server or tax data gathering program that occur before a tax preparation that is to be used to prepare the future electronic tax return is purchased, downloaded or activated by the user.

Referring to FIG. 12, in yet another embodiment, a method for managing data related to a future electronic tax return 132b comprises the user 110 preparing an electronic tax return 132a for Year 1 using a tax preparation application 134a for Year 1 at stage 1205. At stage 1210, communications between the tax data gathering program 144 and the communication device 120 of the user 110 related to the electronic tax return 132b for Year 2 to be prepared are exchanged. The communications may involve one or multiple messages 602 and responses 604. At stage 1215, the data or responses are stored by the tax data gathering program 144 and/or at stage 1220, the tax data gathering program 144 begins preparation of the electronic tax return 132b for Year 2 utilizing received data or responses 604 and the tax preparation application 134b for year 2 that is active and available to the tax data gathering program 144 but not the user 110. Thus, the tax preparation application 134b for year 2 has been developed, and can be accessed by the tax data gathering program 144, but is not yet available on-line or for purchase by the user 110 such that the user 110 can not yet begin working on the electronic tax return 132b for Year 2. At stage 1225, the user 110 purchases, downloads or activates the tax preparation application 134b for year 2, and at stage 1230, the user 110 launches the tax preparation application 134b to begin preparation of the electronic tax return 132b for Year 2. At stage 1235, the electronic tax return 132b for Year 2 is already partially prepared by the tax data gathering program 144 based on received data or response 604 and/or at stage 1240, one or more pages or forms of the electronic tax return 132b for Year 2 are populated by the tax data gathering program 144 or tax preparation application 132b upon beginning preparation of electronic tax return 132b for Year 2. At stage 1245, the tax preparation application 134b for Year 2 may integrate other data from the prior electronic tax return 132a for Year 1 into the electronic tax return 132b for Year 2 if the other data has not changed and can be carried over from the electronic tax returns 132a for Year 1 to the electronic tax return 132b for Year 2. At stage 1250, the electronic tax return 132b for Year 2 is completed using the tax preparation application 134b for Year 2 and filed with the tax authority 160 through the intermediate server 140 at stage 1255.

Thus, in the embodiment illustrated in FIG. 12, the tax data gathering program 144 is operable to acquire tax return data related to the next or following year (Year 2) before the electronic tax return 132b for Year 2 has been prepared, and before the user 110 purchases, downloads or launches or the tax preparation application 134b for Year 2 to prepare the electronic tax return 132b for Year 2.

Figure 13:
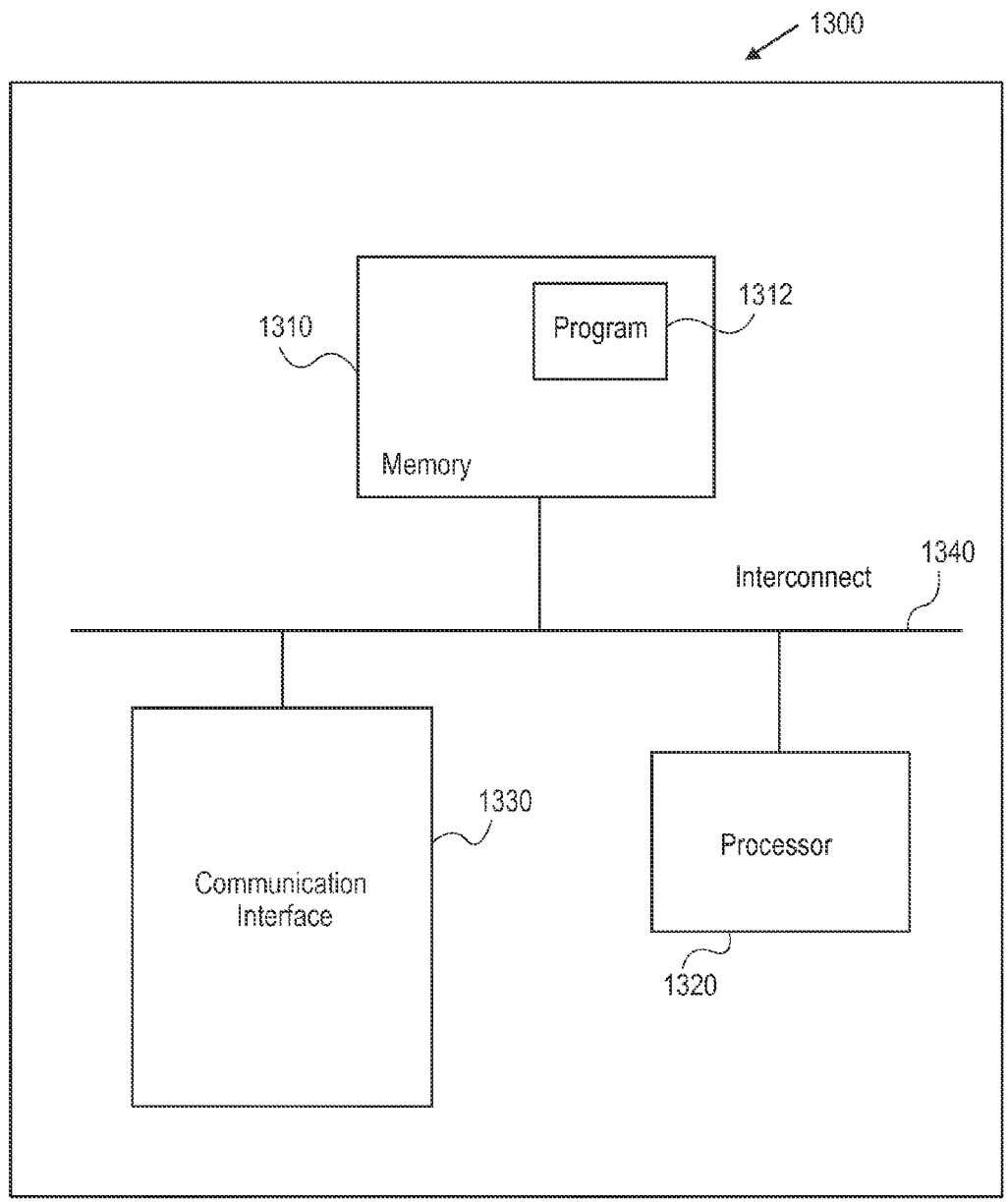
FIG. 13 is a block diagram of components of a computing apparatus or system in which various embodiments may be implemented or that may be utilized to execute various embodiments.

FIG. 13 generally illustrates components of a computing device 1300 that may be utilized to execute embodiments and that includes a memory 1310, account processing program instructions 1312, a processor or controller 1320 to execute account processing program instructions 1312, a network or communications interface 1330, e.g., for communications with a network or interconnect 1340 between such components. The memory 1310 may be or include one or more of cache, RAM, ROM, SRAM, DRAM, RDRAM, EEPROM and other types of volatile or non-volatile memory capable of storing data. The processor unit 1320 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1340 may include a system bus, LDT, PCI, ISA, or other types of buses, and the communications or network interface may, for example, be an Ethernet interface, a Frame Relay interface, or other interface. The network interface 1330 may be configured to enable a system component to communicate with other system components across a network which may be a wireless or various other networks. It should be noted that one or more components of computing device 1300 may be located remotely and accessed via a network. Accordingly, the system configuration provided in FIG. 13 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1320 performs steps or executes program instructions 1312 within memory 1310 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

While certain embodiments are described with reference to preparation of electronic tax returns utilizing TurboTax® for different years, embodiments may be implemented in or utilize other tax preparation applications, which may be consumer and professional tax preparation applications, including, ProSeries® and Lacerte®, H&R Block TaxCut and TaxACT®. Further, embodiments may also be utilized with other finance applications including finance applications such as Quicken®, QuickBooks®, FinanceWorks® and finance applications available from Mint Software, Inc. and Wesabe, Inc. In these other embodiments, communications between a data gathering program and a communication device may be used to update or verify certain information related to finance applications and accounts of a user, consumer or business such as personal information, bank information, etc. It should be understood that the nature of the messages and related responses will vary depending on whether the application involved is a tax preparation application or another type of finance application, and that a data gathering program may be utilized to collect and/or integrate other types of data besides tax-related data.

Moreover, embodiments may involve different numbers and timing of communications between a data gathering program and a communication device. Messages may be sent to a communication device of a user periodically or intermittently. Further, a message may relate to a specific type of data or data item or multiple types of data or data items. Various types of communication devices, networks and message and response formats such as e-mail, text or SMS message and other message formats such as voice and video, e.g. a voice or video message may be sent from the intermediate server to the communication device of the user, and the user can respond via e-mail, text, voice or video as appropriate. Further, although figures illustrate the computer and the communication device as different components, in other embodiments, they may be the same component. Although certain figures illustrate one communication device, embodiments may involve multiple communication devices, which may be the same or different, which may utilize the same or different message and response formats, and which may utilize the same or different networks or combinations of networks.

Further, embodiments may involve different numbers and timing of communications between a data gathering program and a communication device relative to the user receiving forms or data related to the future electronic tax return. For example, embodiments may be operable to gather, store and/or partially complete a future electronic tax return before the user receives a W2 form, a 1099-INT form and other forms or data that are used to prepare the future electronic tax return. Further, a first portion of a first form may be populated by data received at a first time, then a second portion of the same first form may be populated with data received at a later time. Alternatively, a first portion of a first form may be populated by data received at a first time, then a first portion of a different, second form may be populated with data received at a later time.

Moreover, although embodiments are described with reference to examples of certain life events and how information related to these life events can be collected before a tax return for the following year is started, embodiments may involve various numbers and combination of life events, other life events, and may involve the user or others included within an electronic tax return of the user.

Further, while multiple embodiments and variations of the many aspects of the invention have been disclosed and described herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially.

Accordingly, embodiments are intended to exemplify alternatives, modifications, and equivalents that may fall within the scope of the claims.

What is claimed is:

1. A computer-implemented method for collecting data related to a future electronic tax return, the method comprising:

sending a first message from a computer of a host to a communication device of a taxpayer utilizing a tax preparation application for a current, first year to prepare a first electronic tax return for the first year, the computer storing or having access to data related to the first electronic tax return, the first message being related to a future, second electronic tax return of the taxpayer for a future, second year, wherein the second electronic tax return has not yet been prepared and is to be prepared by the taxpayer with the tax preparation application for the second year;

receiving, at the computer and from the communication device of the taxpayer, first data in response to the first message, the first data being related to the second electronic tax return to be prepared; and populating at least a first portion of a first form, page or section of the second electronic tax return based at least in part upon the received first data before the taxpayer begins preparation of the second electronic tax return.

2. The method of claim 1, wherein the first message is sent from the computer to the communication device after the first electronic tax return has been completed and filed by the taxpayer with a tax authority.

3. The method of claim 1, wherein the first message is sent from the computer to the communication device before the first electronic tax return has been filed by the taxpayer with a tax authority.

4. The method of claim 1, wherein the first message is sent from the computer to the communication device before the tax preparation application for the second year is available to the taxpayer.

5. The method of claim 1, wherein the first message is sent from the computer to the communication device before the tax preparation application for the second year is purchased by the taxpayer.

6. The method of claim 1, wherein the first portion of the first form, page or section of the second electronic tax return is populated by the computer when the tax preparation application for the second year is launched by the taxpayer to begin preparation of the second electronic tax return of the taxpayer.

7. The method of claim 1, wherein the taxpayer is unaware that the first portion of the first form, page or section of the second electronic tax return has been populated by the computer.

8. The method of claim 1, further comprising:

the computer sending a second message to the communication device, the second message being related to the second electronic tax return to be prepared; and receiving, at the computer and from the communication device, second data in response to the second message, the second data being related to the second electronic tax return to be prepared.

9. The method of claim 8, further comprising:

the computer populating at least a second portion of the first form, page or section of the second electronic tax return based at least in part upon the received second data before the taxpayer begins preparation of the second electronic tax return, or the computer populating at least a first portion of a second form, page or section of the second electronic tax return based at least in part upon the received second data before the taxpayer begins preparation of the second electronic tax return.

10. The method of claim 1, further comprising:

the computer periodically sending to the communication device, one or more additional messages related to the second electronic tax return of the taxpayer to be prepared by the taxpayer as part of an electronic dialogue with the taxpayer;

receiving, at the computer and from the communication device, respective data in response to the one or more additional messages related to the second electronic tax return to be prepared; and populating at least a portion of respective forms, pages or sections of the second electronic tax return based at least in part upon the received respective data before the taxpayer begins preparation of the second electronic tax return.

11. The method of claim 1, wherein the first message is an electronic mail message, a text message or a video message.

12. The method of claim 1, wherein the first message is sent from the computer to the communication device comprising a cellular telephone, a smartphone, a personal digital assistant, a desktop computer or a laptop computer.

13. The method of claim 1, wherein the first message and the first data sent in response to the first message relate to at least one of an address, a residence, a marital status, an employment status, a child, a spouse, a dependent, a charity, a source of income, an employer, and a tax deduction of the taxpayer.

14. The method of claim 1, wherein the first message and the first data sent in response to the first message relate to a life event of the taxpayer.

15. The method of claim 1, wherein the portion of the form, page or section of the second electronic tax return is populated with data that has changed since the first electronic tax return was prepared or filed.

16. The method of claim 1, wherein the first portion of the first form, page or section of the second electronic tax return is populated with data that is the same as data in the first electronic tax return was prepared or filed.

17. The method of claim 1, wherein a tax data gathering program on the computer is executed to send the first message to the communication device and receive the first data from the communication device.

18. The method of claim 1, wherein the tax data gathering program is part of the tax preparation application.

19. An article of manufacture comprising a non-transitory computer program carrier readable by a computer and embodying one or more instructions executable by the computer to perform the method steps comprising: sending a first message from a computer of a host to a communication device of a taxpayer utilizing a tax preparation application for a current, first year to prepare a first electronic tax return for the first year, the computer storing or having access to data related to the first electronic tax return, the first message being related to a future, second electronic tax return of the taxpayer for a future, second year, wherein the second electronic tax return has not yet been prepared and is to be prepared by the taxpayer with the tax preparation application for the second year, receiving, at the computer and from the communication device of the taxpayer, first data in response to the first message, the first data being related to the second electronic tax return to be prepared, and populating at least a first portion of a first form, page or section of the second electronic tax return based at least in part upon the received first data before the taxpayer begins preparation of the second electronic tax return.

20. The article of manufacture of claim 19, the computer program carrier embodying one or more instructions executable by the computer to send the first message from the computer to the communication device after the first electronic tax return has been completed and filed by the taxpayer with a tax authority.

21. The article of manufacture of claim 19, the computer program carrier embodying one or more instructions executable by the computer to send the first message from the computer to the communication device before the first electronic tax return has been filed by the taxpayer with a tax authority.

22. The article of manufacture of claim 19, the computer program carrier embodying one or more instructions executable by the computer to send the first message from the computer to the communication device before the tax preparation application for the second year is available to the taxpayer.

23. The article of manufacture of claim 19, the computer program carrier embodying one or more instructions executable by the computer to send the first message from the computer to the communication device before the tax preparation application for the second year is purchased by the taxpayer.

24. The article of manufacture of claim 19, the computer program carrier embodying one or more instructions executable by the computer to populate the first portion of the first form, page or section of the second electronic tax return when the tax preparation application for the second year is launched by the taxpayer to begin preparation of the second electronic tax return.

25. The article of manufacture of claim 19, the computer program carrier embodying one or more instructions executable by the computer to send a second message from the computer to the communication device, the second message being related to the second electronic tax return to be prepared, and receive, at the computer and from the communication device, second data in response to the second message, the second data being related to the second electronic tax return to be prepared.

26. The article of manufacture of claim 25, the computer program carrier embodying one or more instructions executable by the computer to populate at least a second portion of the first form, page or section of the second electronic tax return based at least in part upon the received second data before the taxpayer begins preparation of the second electronic tax return, or populate at least a first portion of a second form, page or section of the second electronic tax return based at least in part upon the received second data before the taxpayer begins preparation of the second electronic tax return.

27. The article of manufacture of claim 19, the computer program carrier embodying one or more instructions executable by the computer to send a first message comprising an electronic mail message, a text message or a video message.

* * * * *